Dec. 1, 1936.  A. TALON  2,062,801
REMOVABLE GUIDING DEVICE FOR AUTOMOBILE VEHICLES RUNNING ON RAILS
Filed March 25, 1933  5 Sheets-Sheet 2

Dec. 1, 1936.   A. TALON   2,062,801
REMOVABLE GUIDING DEVICE FOR AUTOMOBILE VEHICLES RUNNING ON RAILS
Filed March 25, 1933   5 Sheets-Sheet 3
Fig: 4
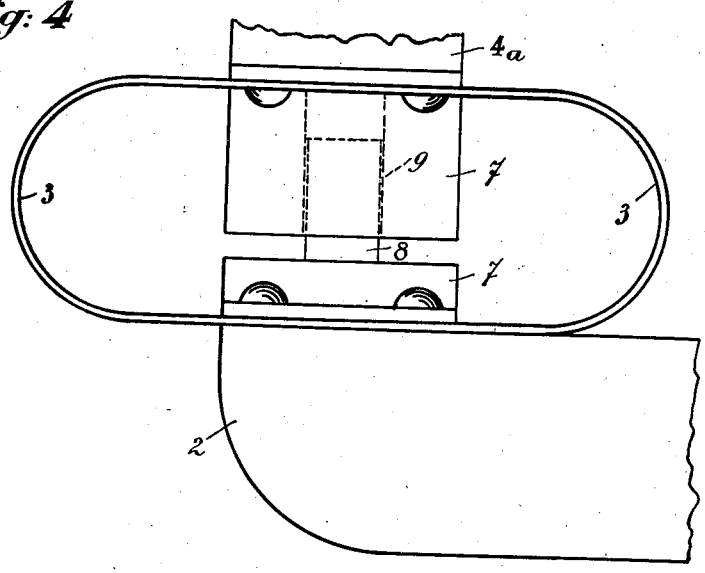
Fig: 5
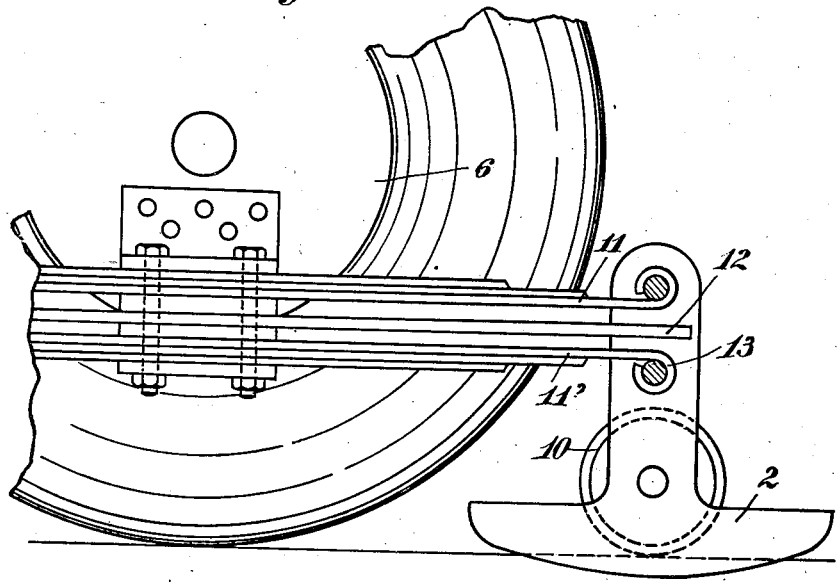
Inventor:
Augustin Talon
By Mauro & Lewis
Attorneys

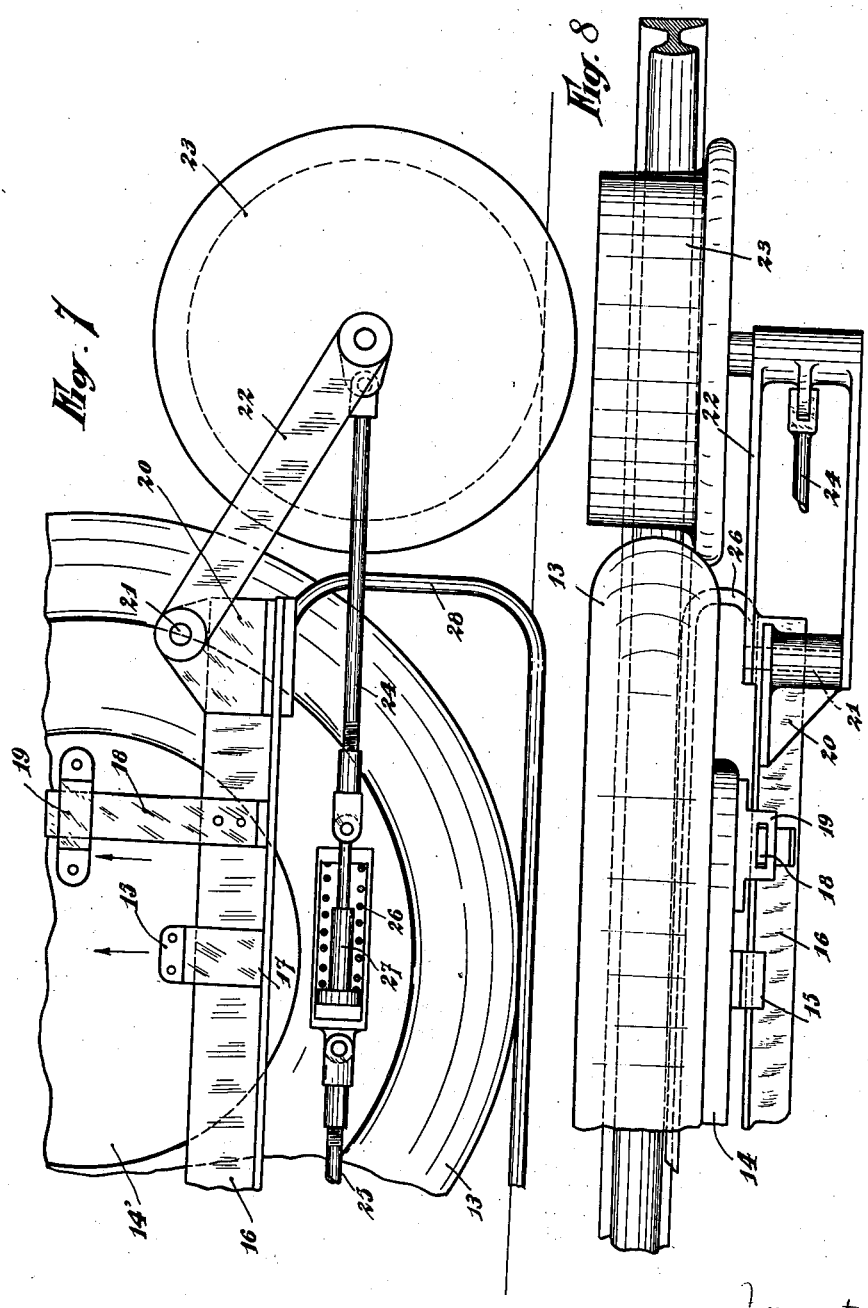

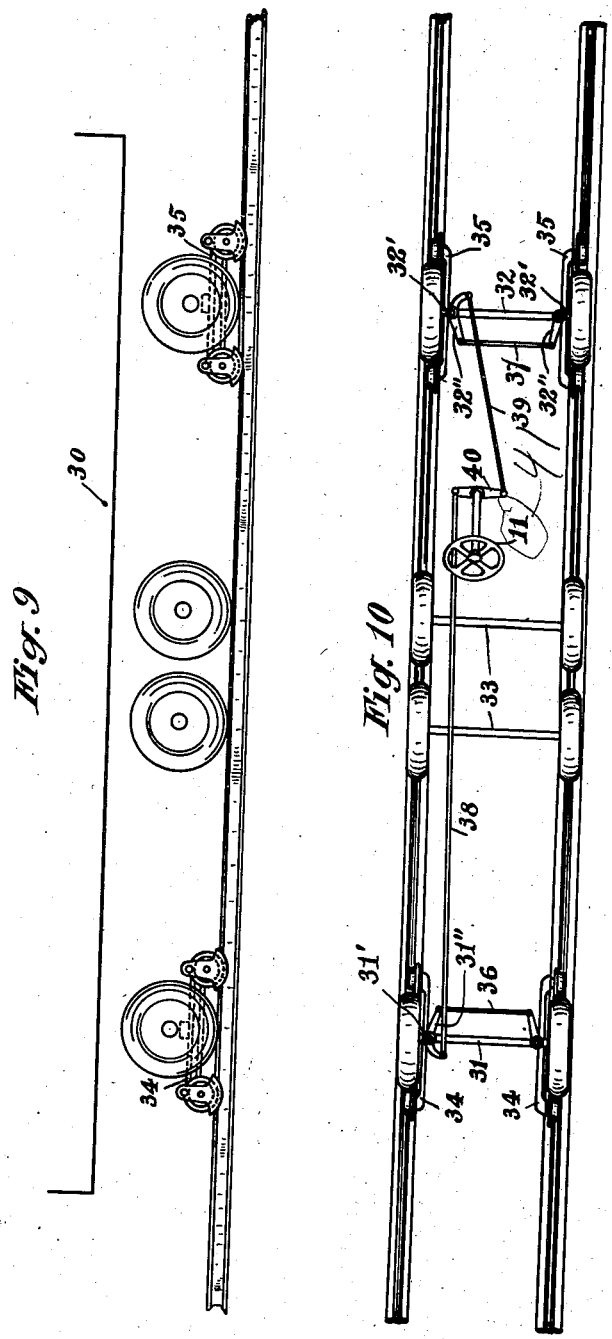

UNITED STATES PATENT OFFICE 2,062,801

REMOVABLE GUIDING DEVICE FOR AUTOMOBILE VEHICLES RUNNING ON RAILS

Augustin Talon, Bourg-la-Reine, France, assignor of one-half to Societe Anonyme des Pneumatiques Dunlop, Paris, France, a corporation of France Application March 25, 1933, Serial No. 662,790
In Belgium April 7, 1932

13 Claims. (Cl. 105—215)

The present invention relates to guiding devices for automobile vehicles intended to run both on railway tracks and on roads and which comprise guiding members of light weight capable of being, if desired, brought into inoperative position.

The object of my invention is to provide a guiding device of that type, in which the steering mechanism of the vehicle is utilized in such manner as to reduce to a minimum the reactions of the track on the light guiding members above referred to.

The essential feature of the guiding device according to my invention lies in the fact that each wheel is provided with a guiding member, consisting of one or several shoes of suitable outline bearing on the rail on either side of the wheel, and either sliding with a slight friction on the tread of the rail or bearing thereupon through one or several rollers.

The guiding action proper is performed by a flange similar to that of railway vehicle wheels, which can be applied against the rail at one or several points of contact where lubrication can be ensured.

The guiding member of each of the wheels through which an automobile vehicle is normally steered, is rigidly fixed to the stub axle of said wheel, either through a direct connection with a part such as the plate of the brake drum, or through a lever mounted on the pivot pin of the wheel in the same manner as the steering arm of the ordinary steering mechanism of an automobile vehicle.

The wheels that normally ensure the steering of the vehicle being thus suitably turned owing to slight stresses exerted by the rails on the guiding members, the path of travel of the rear wheels is slightly displaced towards the centre of the curve (that is to say, in a direction opposite to that of the thrust produced by the centrifugal force) with respect to the path of travel of the front wheels, which are applied by the flanges of their guiding members against the outer rail.

This difference between the paths of travel of the front wheels and the rear wheels, the value of which depends on the radius of curvature of the track and on the wheel base of the vehicle, is maintained, if need be, within the limits of safety imposed by the minimum width of the wheel tires that must remain on the tread surface of the rails, through the guiding members of the rear wheels. Said guiding members, being elastically connected to the axle, are brought into action only when the transversal displacement of the rear axle of the vehicle reaches the limit value above referred to.

The guiding members of the front wheels and also those of the rear wheels, are maintained in contact with the rails while the vehicle is running on the railway track, their upward displacement being limited by an elastic shock absorbing device fixed to the unsuspended portion of the vehicle frame. Said guiding members may, in the event of the pneumatic tire getting punctured, support the whole or a portion of the load of the injured wheels.

The guiding members may be mounted in such manner that they can readily be lifted from the rail and fixed in an inoperative position under the frame, so that the vehicle now adapted to run on a road is given back its essential characteristics.

In a certain embodiment of my invention, the guiding device comprises a frame fixed in a removable manner to the brake drum or any other member pivoting together with the wheel in the steering displacement thereof, said frame being connected in an elastic manner with the flanged rollers resting on the rail on either side of said wheel.

The rollers can be carried by arms pivoted to the removable frame, and said arms can be connected together by a system of rods or similar members including springs which are so disposed as to apply the rollers against the surface of the rail. Said springs can be combined with stops which limit the displacements thereof, and serve to transmit the load of the wheel to the rollers when the pneumatic tire of said wheel happens to collapse.

According to an embodiment of the present invention, the automobile vehicle comprises two end axles provided with guiding devices and the wheels of which are adapted to cooperate in the steering of the vehicle, the steering displacements of said wheels being coupled through a connecting mechanism similar to those that are provided on some road vehicles having three axles.

Means are provided for causing said connecting mechanism, which is controlled through a steering wheel, to become inoperative when the vehicle is running on rails. The intermediate axles, if any, could be optionally provided with guiding devices.

Preferred embodiments of my invention will be hereinafter described with reference to the accompanying drawings given merely by way of example, and in which:

Fig. 4 shows an embodiment of a detail;

Fig. 5 shows another embodiment of the guiding shoe and of its connection to the wheel;

Fig. 7 is a side elevational view of a portion of a vehicle provided with another embodiment of the guiding device according to my invention;

Fig. 8 is a plan view corresponding to Fig. 7;

Fig. 9 is an elevational view of a vehicle, the end axles of which are coupled together according to my invention;

Fig. 10 is a plan view of a set of wheels of the vehicle of Fig. 9.

Figure 1:
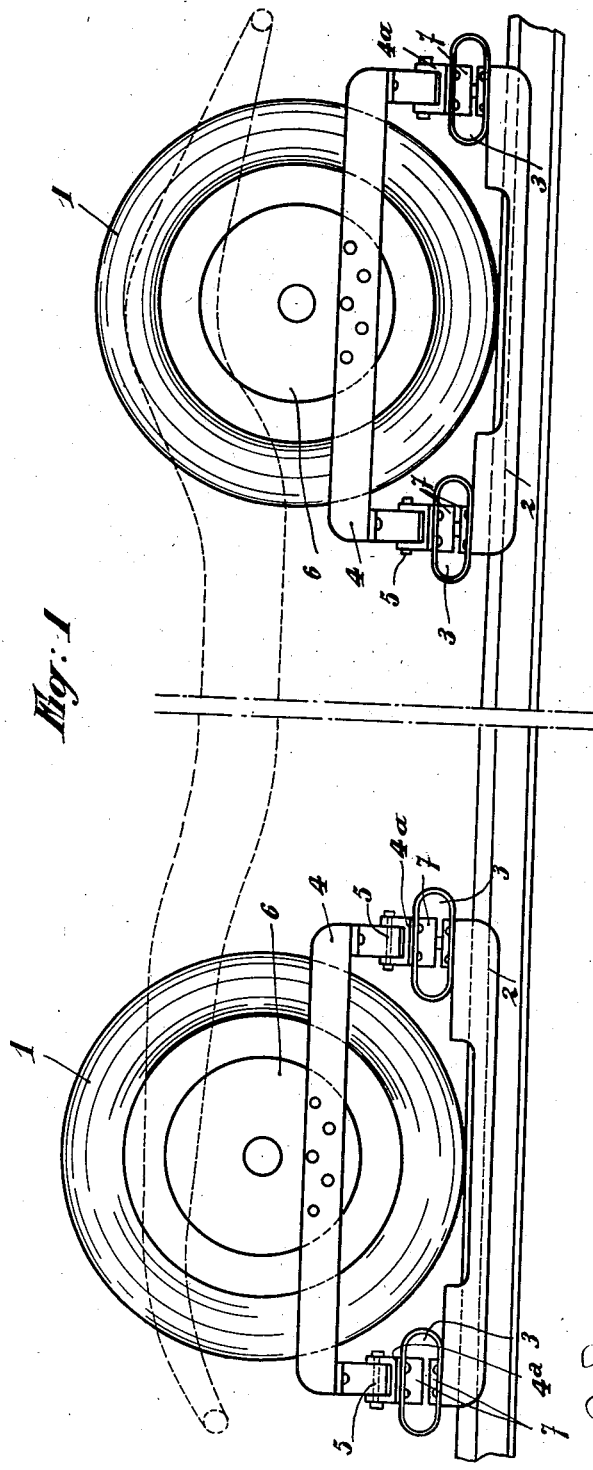
Fig. 1 is a diagrammatic side elevational view of an automobile vehicle provided with a guiding device according to my invention.
Figure 2:
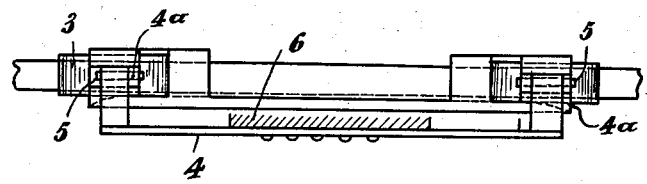
Fig. 2 is a partial plan view of the same vehicle, the wheel having been removed for the sake of clearness.
Figure 3:
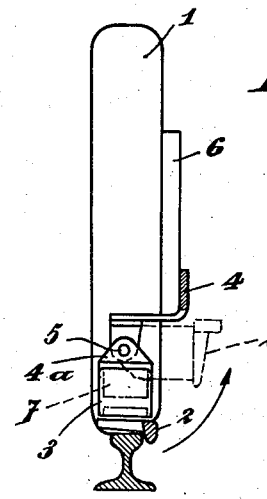
Fig. 3 is a cross section showing the outline of the guiding member.

The brake drum cover plate 6 of the front and rear wheels 1 of the vehicle shown in Fig. 1, carries a support 4 provided at its end with spindles 5, 5, about which members 4ª are pivotally mounted. Said members 4ª carry, through elastic means, for instance springs 3, 3, guiding shoes 2 thus held in contact with the tread of the rail. Owing to the presence of spindles 5, 5, members 4 can be swung up and held in an inoperative position for which the vehicle can run in the usual manner on a road. I have shown in dotted lines in Fig. 3, the upper or inoperative position of the guiding members after their pivoting in the direction of the arrow. The displacement of the movable part of the guiding members is effected by means of suitable controlling devices, such for instance as cables. The flattening of springs 3 is limited by the presence of pads 7, either rigid or of a limited elasticity, which support the vehicle in the event of the tire becoming deflated.

Fig. 4 shows, on an enlarged scale, these means for vertically supporting the shoe as above described and illustrated, said means being further adapted to partly, or wholly, limit the horizontal displacements of shoe 2 with respect to its frame 4 by means of a finger or piston 8 integral with the shoe and adapted to slide vertically in a housing 9 provided in a piece integral with frame 4, said piece being 7 in the example shown. Of course, the arrangement can be reversed, that is to say, the male piece can be carried by member 4ª.

In the embodiment of my invention shown in Fig. 5, the shoe is divided into two independent elements 2 resting on the rail through rollers 10 and elastically connected to the brake drum cover plate of the wheel through springs 11 and 11', or through a spring and two small connecting rods, said rods replacing either of the two springs 11 or 11', for instance the lower spring 11'.

The wheel is supported, in the case of the tire getting deflated, through a plate 12 which is but little, or not, flexible, and comes to rest upon the eyes 13 of the lower spring 11'.

This guiding member could be completed by means of devices which tend to scrap the rain or to cut away frost.

Figure 6:
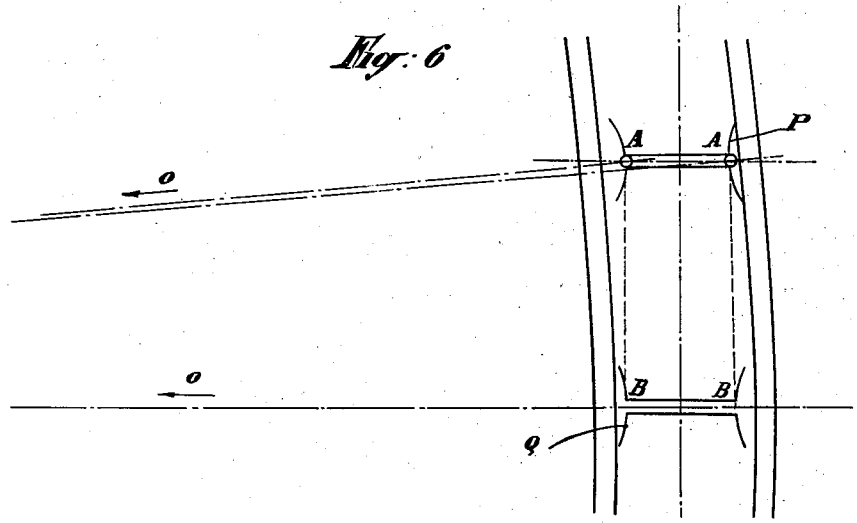
Fig. 6 is a diagrammatical view illustrating the operation of the device.

Referring to Fig. 6, it will be seen that the vehicle being supposed to run on the rails in a curve, and the effects of centrifugal forces not being taken into account, the outer front guiding shoe P bears against the rail, placing the outer front wheel in a position exactly parallel to the tangent to the rail, while the inner front wheel is suitably turned by means of a tie-rod and the steering arms. It is known that, owing to the structure of the steering mechanism, the front wheels of a vehicle made for running on roads are not parallel in curves, but their axes meet at the centre of the curve. In a vehicle provided with a guiding device according to my invention as above explained, the action of the tie-rod cannot interfere with that of the guiding shoes, since there is always only one shoe that bears upon the rail.

On the other hand, it will be seen that the axis B, B of the rear axle passes also through said centre O, but as triangles O, A, B are rectangular at B, sides OB are respectively shorter than sides OA, so that the rear wheels of the vehicle are pushed toward the inside by a distance equal to the difference OA—OB. As said difference is small for usual curves, the inner rear shoe Q will not necessarily come into contact with its rail if a suitable play has been provided. On the other hand, the centrifugal action that has not been taken into account up to now, tends to oppose the centripedal tendencies of the rear wheels, and to accordingly reduce the reaction of the inner rail upon shoe Q.

The particular embodiment shown in Figs. 7 and 8 relates to the arrangement shown in Fig. 5, and to the general arrangement of Fig. 1.

The brake drum cover plate 14' of wheel 14 is provided with an iron member 17 bent at two places and fixed at 15 to said plate so as to leave between it and the plate, a space sufficient for the passage of the vertical wing of an L iron 16. The vertical displacements of said iron 16 are therefore necessarily limited in the upward direction by said member 17, the contact taking place either between the horizontal wing of the L iron and the lower end of piece 17, or at any other place. Iron 16 further carries vertical fingers 18 adapted to engage in slots provided between stirrups 19 and cover plate 14'.

The frame thus formed, which is inserted in position by sliding it upwardly along cover plate 14', carries at either end a bracket 20 to which is pivoted, about a spindle 21, an arm 22. Said arm 22 carries, journalled thereto, a roller 23 provided with a guiding flange. Arms 22 are connected together through a system of rods 24, 25, comprising an elastic portion. For instance, rod 25 is provided with a socket in which a piston 27 carried by rod 24 is adapted to move against the action of a spring 26. Said piston is adapted to play the part of a stop so that the length of the connection between 24 and 25 may be maintained between well defined limits. Furthermore, in case of the pneumatic tire of wheel 14 collapsing, the load of said wheel is transmitted to roller 23, the deformation trapezium formed by L iron 16, rods 24, 25 and arms 22 being limited. Iron 16 may itself comprise a supplementary guiding member, consisting for instance of a metallic bar 28 of suitable cross section and suitably bent. The fitting of the guiding members on the vehicle and their removal therefrom, are easy to perform by lifting the vehicle by means of a jack.

It should be well understood that the above described arrangements have been given merely by way of example, and should not be considered as limiting applicant's invention. In particular, the guiding member when it is associated with a wheel the direction of the axis of which is fixed with respect to the vehicle, may be sufficiently long in order that the end rollers may be disposed on either side, not of one wheel, but of several consecutive wheels, said guiding members being fixed to the brake drum cover plates of several of said wheels. This arrangement can obviously be utilized with the guiding members above described with reference to Figs. 1 to 6. It will also be understood that in order to connect the frame of the guiding member to the wheel, I may utilize any fixation means adapted to be quickly detached which answer the desired purpose.

In the vehicle shown in Figs. 9 and 10, the body 30 rests on two end axles 31, 32, the wheels of which serve for the steering of the vehicle, and on a certain number of intermediate carrying axles 33. Axles 31, 32 are each provided with guiding devices 34, 35, made as above described. Axles 33 may, as the case may be, either be provided with said guiding means, or not.

The wheels of axle 31 are carried by steering knuckles 31' pivoted to said axle and provided with steering arms 31'' which are connected together by spacer bar 36. In a likewise manner, the wheels of axle 32 are carried by steering knuckles 32' pivoted to the ends of said axle 32 and provided with steering arms 32'' which are connected together by spacer bar 37. These steering systems can be actuated through their respective drag links 38 and 39 by a steering wheel 41 rigidly connected to an equalizing bar 40 to the respective ends of which said drag links are pivoted. It will readily be understood that when steering wheel 41 is turned in a clockwise direction the steering knuckles of axle 32 are turned in a clockwise direction (Fig. 10) while the steering knuckles of axle 31 are turned in an anticlockwise direction. When steering wheel 41 is turned in the opposite direction, the movements are reversed. Of course, this coupling mechanism is given merely by way of example, and could be replaced by any other suitable mechanism giving the same result. As the coupling of the end axles is not necessary when the vehicle runs on a railway track, since guiding devices 34 and 35 ensure the correct turning of the wheels in the curves, suitable means are provided for putting said coupling device out of action. It suffices for instance, that either one of said rods 38, 39, or both of them, may be disconnected at the place where they are pivoted either to the steering mechanism, or the equalizing bar. Said rods 38, 39 may also consist of two portions that can be either rigidly assembled together, or left free with respect to each other.

While I have described what I deem to be practical and efficient embodiments of my invention, it should be well understood that I do not wish to be limited thereto, as there might be changes made in the arrangement, disposition and form of the parts without departing from the principle of my invention as comprehended within the scope of the appended claims.

What I claim is:

1. In a vehicle adapted to run on roads and on rails, and including a plurality of wheels at least two of which are pivotable with respect to said vehicle about substantially vertical axes, a brake drum having a non-rotary cover plate for each wheel, and axles for said wheels, a guiding device comprising in combination, light weight guiding means for each wheel adapted to bear on the corresponding rail on either side of the vertical plane of the axle of said wheel, a frame for connecting said guiding means to the brake drum cover plate of said wheel so that said axle and said guiding means are caused to rotate as a unit about a common vertical axis, elastic means between said frame and said guiding means for permitting said guiding means to move in a vertical direction with respect to said frame, and means for limiting the vertical displacement of said guiding means with respect to said frame.

2. In a vehicle adapted to run both on roads and on rails, and including a plurality of wheels at least two of which are pivotable with respect to said vehicle about substantially vertical axes, a brake drum having a nonrotary cover plate for each wheel, and axles for said wheels, a guiding device comprising in combination, light weight guiding shoes for each wheel adapted to bear on the corresponding rail on either side of the vertical plane of the axle of said wheel, a longitudinal bar rigidly fixed to the brake drum cover plate of said wheel, and a loop-shaped spring for connecting each end of said bar to said guiding shoes.

3. A guiding device according to claim 2 further comprising, a pad inserted between the two horizontal portions of said loop-shaped spring for limiting the crushing thereof.

4. A guiding device according to claim 2 further comprising, a member fixed to one of the horizontal portions of said loop-shaped spring provided with a substantially vertical hole, and a substantially vertical member fixed to the other horizontal portion of said loop-shaped spring adapted to engage said hole for limiting the horizontal longitudinal displacements of said shoe with respect to said frame.

5. In a vehicle adapted to run both on roads and on rails, and including a plurality of wheels, at least two of which are pivotable with respect to said vehicle about substantially vertical axes, a brake drum having a non-rotary cover plate for each wheel, and axles for said wheels, a guiding device comprising in combination, guiding means for each wheel adapted to bear on the corresponding rail on either side of the vertical plane of the axle of said wheel, a frame rigidly fixed to the brake drum cover plate of said wheel, at least one leaf spring fixed at its middle part to said frame and carrying at either end said guiding means, and a plate of little flexibility rigidly fixed to said frame for limiting the vertical displacement of the ends of said spring.

6. In a vehicle adapted to run both on roads and on rails, and including a plurality of wheels at least two of which are pivotable with respect to said vehicle about substantially vertical axes, a brake drum having a non-rotary cover plate for each wheel, and axles for said wheels, a guiding device comprising in combination, a bar, means for removably fixing said bar to said cover plate in a horizontal and longitudinal direction, an arm pivoted to each end of said bar about an axis parallel to said axle, guiding means fixed to the respective ends of said arms respectively and adapted to bear against said rail on either side of the vertical plane of said axle, and common means for limiting the pivoting displacements of said arms.

7. In a vehicle adapted to run both on roads and on rails, and including a plurality of wheels at least two of which are pivotable with respect to said vehicle about substantially vertical axes, a brake drum having a non-rotary cover plate for each wheel, and axles for said wheels, a guiding device comprising in combination, a bar, means for removably fixing said bar to said cover plate in a horizontal and longitudinal direction, an arm pivoted to each end of said bar about an axis parallel to the axle of said wheel, said arms extending downwardly and outwardly with respect to said bar, a flanged roller journalled in the lower end of each of said arms respectively and adapted to run on the rail, two connecting rods pivotally connected to said arms respectively and extending toward each other in a substantillay horizontal direction, and elastic means between the adjacent ends of said rods for limiting the pivoting displacements of said arms.

8. In a vehicle adapted to run both on roads and on rails, and including a plurality of wheels at least two of which are pivotable with respect to said vehicle about substantially vertical axes, a brake drum having a non-rotary cover plate for each wheel and axles for said wheels, a guiding device comprising in combination, a bar, means for removably fixing said bar to said cover plate in a horizontal and longitudinal direction, an arm pivoted to each end of said bar about an axis parallel to the axle of said wheel, said arms extending downwardly and outwardly with respect to said bar, a flanged roller journalled in the lower end of each of said arms respectively and adapted to run on the rail, two connecting rods pivotally connected to said arms respectively and extending toward each other in a substantially horizontal direction, a cylinder fixed to one of the adjacent ends of said rods, a piston fixed to the other adjacent end adapted to slide in said cylinder, a spring between said piston and said cylinder opposing outward displacements of said rods, and stops for limiting the relative displacements of said rods.

9. A device according to claim 7 in which the means for removably fixing said bar to said cover plate comprise at least one piece rigidly fixed to the cover plate adapted to limit vertical displacements of said bar with respect to said cover plate, and cooperating guiding means on said cover plate and on said bar for keeping said bar in the desired longitudinal direction.

10. A guiding device according to claim 7 further comprising a guiding member fixed to said bar and extending between said rollers so as to bear upon the rail.

11. In a road and rail vehicle including a structure pivoted to said vehicle about a substantially vertical axis and having a wheel adapted to revolve when running about a substantially horizontal axis with reference to said structure, the combination of means for guiding said wheel on a rail, adapted to engage the latter both in front and in rear of said wheel, and vertically resilient means for supporting said guiding means from said structure, whereby the guiding means are adapted to swivel together with said wheel.

12. In a road and rail vehicle including a structure pivoted to said vehicle about a substantially vertical axis and having a wheel adapted to revolve when running about a substantially horizontal axis with reference to said structure, the combination of means for guiding said wheel on a rail, adapted to engage the latter both in front and in rear of said wheel, vertically resilient means for supporting said guiding means from said structure, so as to permit a certain amount of vertical displacement of said guiding means with respect to said structure, and means for limiting the upward displacement of said guiding means with respect to said structure.

13. In a road and rail vehicle including a structure pivoted to said vehicle about a substantially vertical axis and having a wheel adapted to revolve when running about a substantially horizontal axis with reference to said structure, a guiding device forming a unit in itself which comprises, in combination, guiding means adapted to engage the rail in front and in rear of said wheel, and means for securing said guiding means to said structure in such manner that said guiding means swivel coaxially and simultaneously with the wheel, the second-named means including a horizontal axis pivotal connection, whereby said guiding means may be swung into inoperative position.

AUGUSTIN TALON.